(12) United States Patent
Barbu et al.

(10) Patent No.: US 12,477,510 B2
(45) Date of Patent: Nov. 18, 2025

(54) METHOD AND APPARATUS FOR EFFICIENT POSITIONING

(71) Applicant: Nokia Technologies Oy, Espoo (FI)

(72) Inventors: Oana-Elena Barbu, Aalborg (DK); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 290 days.

(21) Appl. No.: 18/266,147

(22) PCT Filed: Nov. 18, 2021

(86) PCT No.: PCT/EP2021/082147
§ 371 (c)(1),
(2) Date: Jun. 8, 2023

(87) PCT Pub. No.: WO2022/128315
PCT Pub. Date: Jun. 23, 2022

(65) Prior Publication Data
US 2024/0040542 A1    Feb. 1, 2024

(30) Foreign Application Priority Data
Dec. 14, 2020    (FI) ..................................... 20206295

(51) Int. Cl.
*H04W 4/00*    (2018.01)
*H04L 5/00*    (2006.01)
*H04W 68/00*    (2009.01)

(52) U.S. Cl.
CPC ........... *H04W 68/00* (2013.01); *H04L 5/0051* (2013.01)

(58) Field of Classification Search
CPC ..... H04W 88/18; H04W 68/00; H04W 76/40; H04W 76/14; H04W 64/00
See application file for complete search history.

(56) References Cited

U.S. PATENT DOCUMENTS

| | | | |
|---|---|---|---|
| 2016/0095080 A1 | 3/2016 | Khoryaev et al. | |
| 2018/0077529 A1 | 3/2018 | Ryu et al. | |
| 2019/0230618 A1* | 7/2019 | Saur | H04W 56/001 |

* cited by examiner

*Primary Examiner* — Omoniyi Obayanju
(74) *Attorney, Agent, or Firm* — Lippes Mathias LLP

(57) ABSTRACT

An apparatus including: circuitry for listening to a PM SL broadcast or multicast broadcasted by a reference UE-S; circuitry for receiving a positioning measurement request from a location server, wherein the positioning measurement request includes a reduced list of transmission points providing PRS to be measured, said reduced list containing a subset of transmission points to be measured with respect to a list that is used for measurement by the reference UE-S; circuitry for selecting respective transmission points to be listened; circuitry for performing the measurement of PRS being listed in the reduced list, where a set of measured PRS is adjusted based on the received PM SL, and where the adjustment concerns excluding measured PRS stored in PMSL; circuitry for generating a report including the PRS; and circuitry for transmitting the report to the location server.

7 Claims, 7 Drawing Sheets

METHOD AND APPARATUS FOR EFFICIENT POSITIONING

CROSS REFERENCE TO RELATED APPLICATION

This patent application is a U.S. National Stage application of International Patent Application Number PCT/EP2021/082147 filed Nov. 18, 2021, which is hereby incorporated by reference in its entirety, and claims priority to FI 20206295 filed Dec. 14, 2020.

TECHNICAL FIELD

The present invention relates to a solution for determining position of a user equipment.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

5G stands for the fifth-generation mobile network, which enables connection between machines, objects and devices. One of the categories introduced in 5G NR (Fifth Generation New Radio) networks is NR Positioning. The two latest versions of the 5G standard are 3GPP Release 16 and 17.

3GPP Release 16 introduced various location technologies to support regulatory and commercial use case. The horizontal positioning requirements for indoor scenarios and outdoor scenarios were specified.

3GPP Release 17 is targeted for a higher accuracy location requirements to meet performance targets having sub-meter level positioning accuracy <1 m for general commercial use cases, and <0.2 m position accuracy for IIoT (Industrial Internet of Things) use cases.

The positioning protocol according to the standard mandates the UE to report back timing and/or angular measurements for all detectable beams of all detectable transmit receive points (TRP) upon request from a network entity, e.g. from a location management function (LMF). The UE treats each positioning request identically, i.e. by listening for, and measuring beamed downlink positioning reference signals (PRS) during a certain time window.

In a beamed transmission-reception scenario, the UE needs to measure hundreds of beams for each request. It becomes therefore impractical for the LMF to ask for the measurements at each request, without prior evaluation of whether the measurement is useful. Thus, there is a need for an improved device-efficient solution which can accommodate a reduced positioning session.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the example embodiments are disclosed in the dependent claims and in the corresponding images and description.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect, there is provided an apparatus comprising means for listening and receiving a positioning measurement sidelink (PM SL) broadcast or multicast transmitted by at least one reference user equipment (UE-S); means for listening and receiving a positioning measurement request from a location server, wherein the positioning measurement request comprises a reduced list of transmission points providing positioning reference signals (PRS) to be measured, said reduced list containing a subset of transmission points to be measured with respect to a list that is used for measurement by the reference user equipment (UE-S); means for performing the measurement of positioning reference signals (PRS) from the transmission points being listed in the reduced list of transmission points, where a set of measured PRS is adjusted based on the received PM SL; means for generating a report comprising the positioning reference signals measured and/or from the received PM SL broadcast/multicast; and means for transmitting the report to the location server.

According to an example embodiment the adjustment of measured PRS concerns excluding measured PRS stored in the received PM SL broadcast/multicast.

According to an example embodiment the apparatus further comprises means for receiving a peer report configuration from the location server, the peer report configuration comprising one or more of the following: configuration on forwarding positioning reference signals; configuration for selecting the transmission points; classification of measurement reports.

According to an example embodiment the list of transmission points comprises such transmission points that are detectable by the apparatus if it is located at a predicted position.

According to an example embodiment the apparatus further comprises means for evaluating the reduced list, the means for evaluating being configured to evaluate each entry in the list to check if a measurement has been broadcasted by a peer user equipment in a certain time window; determine when a tuple entry has been measured and broadcasted by a reference aid user equipment located nearby, and to forward such measurement.

An apparatus according to a second aspect comprises at least one processor and at least one memory, said at least one memory stored with computer program code thereon, the at least one memory and the computer program code configured to, with the at least one processor, cause the apparatus at least to listen and to receive a positioning measurement sidelink (PM SL) broadcast/multicast transmitted by at least one reference user equipment (UE-S); to listen and to receive a positioning measurement request from a location server, wherein the positioning measurement request comprises a reduced list of transmission points providing positioning reference signals (PRS) to be measured, said reduced list containing a subset of transmission points to be measured with respect to a list that is used for measurement by the reference user equipment (UE-S); to perform the measurement of positioning reference signals (PRS) from transmission points being listed in the reduced list of transmission points, where a set of measured PRS is adjusted based on the received PM SL broadcast/multicast; to generate a report comprising the positioning reference signals measured and/or from the received PM SL broadcast/multicast; and to transmit the report to the location server.

A method by the user equipment according to a third aspect comprises listening and receiving a positioning measurement sidelink (PM SL) broadcast/multicast transmitted by at least one reference user equipment (UE-S); listening and receiving a positioning measurement request from a location server, wherein the positioning measurement request comprises a reduced list of transmission points providing positioning reference signals (PRS) to be measured, said reduced list containing a subset of transmission points to be measured with respect to a list that is used for measurement by the reference user equipment (UE-S); performing the measurement of positioning reference signals (PRS) from transmission points being listed in the reduced list of transmission points, where a set of measured PRS is adjusted based on the received PM SL broadcast/multicast; generating a report comprising the positioning reference signals measured and/or from the received PM SL broadcast/multicast; and transmitting the report to the location server.

An apparatus according to a fourth aspect comprises means for transmitting a positioning measurement request to at least one reference user equipment (UE-S), wherein the request comprises at least a configuration for broadcasting measurements of positioning reference signals (PRS) from a plurality transmission points; means for receiving a request to locate a target user equipment (UE-Eff); means for determining that at least one reference user equipment (UE-S) near the target user equipment (UE-Eff) has performed a positioning measurement from a plurality of transmission points, whereupon a reduced positioning measurement request is transmitted to the target user equipment (UE-Eff), said reduced positioning measurement request comprising a reduced list containing a subset of the plurality of transmission points to be measured; means for receiving a report from the target user equipment (UE-Eff), the report comprising measurements of the positioning reference signals (PRS) from the subset of transmission points being listed in the reduced list of transmission points; and means for performing a location estimation based on the received report.

According to an example embodiment, the apparatus further comprises means for configuring the target user equipment (UE-Eff) with a peer report configuration, comprising one or more of the following: configuration on forwarding the measurements of the positioning reference signals (PRS); configuration for selecting the transmission points;
classification of measurement reports.

According to an example embodiment, the apparatus further comprises means for analyzing historical data for the target user equipment (UE-Eff) to determine whether an earlier location estimation has been performed.

According to an example embodiment, the apparatus further comprises means for predicting future locations for the target user equipment (UE-Eff) in order to select the subset of transmission points transmitting positioning reference signals (PRS) to be measured by the target user equipment (UE-Eff).

According to an example embodiment, the apparatus further comprises means for creating or updating a mobility profile of the target user equipment (UE-Eff) by using the historical data to predict the future locations.

According to an example embodiment, the subset of transmission points are selected according to predicted location of the target user equipment (UE-Eff).

According to an example embodiment, the historical data comprises one or more of the following: type of the target user equipment; estimated velocities; service beam indices; service cell IDs in a time window.

An apparatus according to a fifth aspect comprises at least one processor and at least one memory, said at least one memory stored with computer program code thereon, the at least one memory and the computer program code configured to, with the at least one processor, cause the apparatus at least to transmit a positioning measurement request to at least one reference user equipment (UE-S), wherein the request comprises at least a configuration for broadcasting measurements of positioning reference signals (PRS) from a plurality of transmission points; to receive a request to locate a target user equipment (UE-Eff); to determine that at least one reference user equipment (UE-S) near the target user equipment (UE-Eff) has performed a positioning measurement from a plurality of transmission points, whereupon a reduced positioning measurement request is transmitted to the target user equipment (UE-Eff), said reduced positioning measurement request comprising a reduced list containing a subset of the plurality of transmission points to be measured; to receive a report from the target user equipment (UE-Eff), the report comprising measurements of the positioning reference signals (PRS) from the subset of transmission points being listed in the reduced list of transmission points; and to perform a location estimation based on the received report.

A method according to a sixth aspect comprises transmitting a positioning measurement request to at least one reference user equipment (UE-S), wherein the request comprises at least a configuration for broadcasting measurements of positioning reference signals (PRS) from a plurality of transmission points; receiving a request to locate a target user equipment (UE-Eff); determining that at least one reference user equipment (UE-S) near the target user equipment (UE-Eff) has performed a positioning measurement from a plurality of transmission points, whereupon a reduced positioning measurement request is transmitted to the target user equipment (UE-Eff), said reduced positioning measurement request comprising a reduced list containing a subset of the plurality of transmission points to be measured; receiving a report from the target user equipment (UE-Eff), the report comprising measurements of the positioning reference signals (PRS) from the subset of transmission points being listed in the reduced list of transmission points; and performing a location estimation based on the received report.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms carrying out an efficient positioning. While the following description focuses on 5G networks, the example embodiments as described further below should not unnecessarily be interpreted to be limited to said networks only, but they are applicable in any network supporting device and network efficient positioning.

Figure 1:
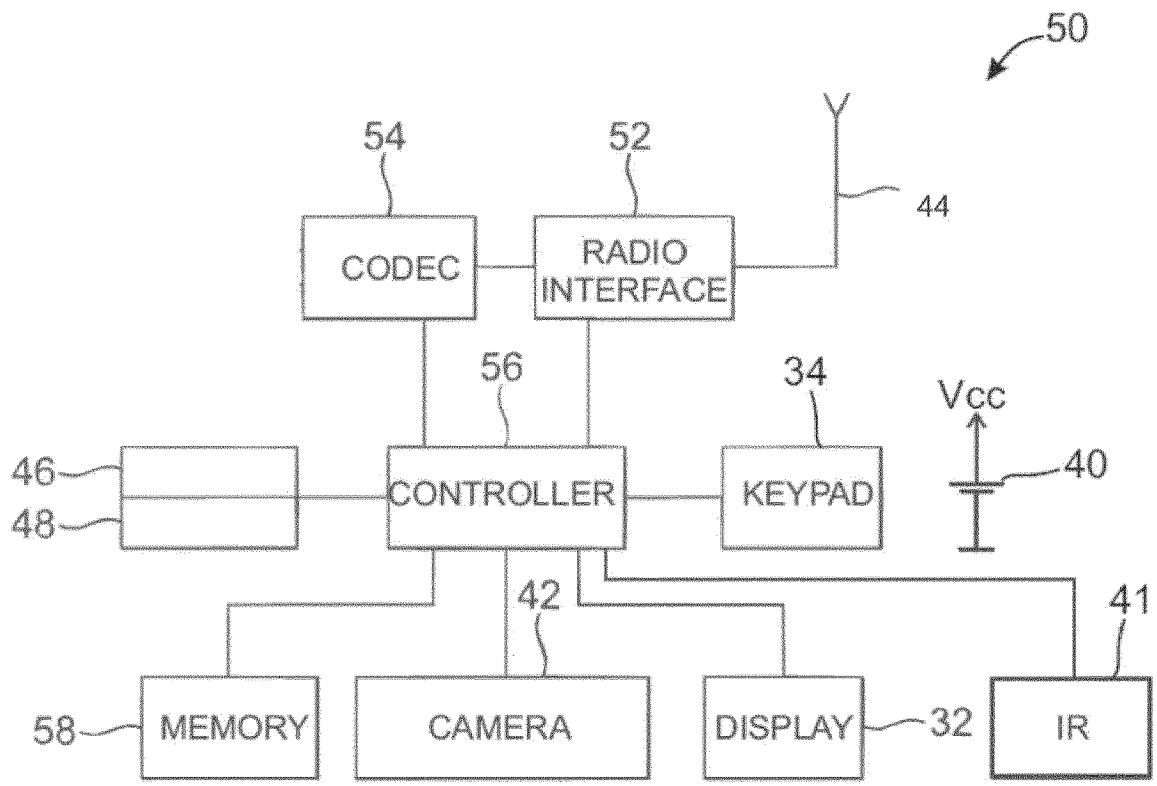
FIG. 1 shows a schematic block diagram of an apparatus for incorporating a dual-SIM/MUSIM arrangement according to the example embodiments.
Figure 2:
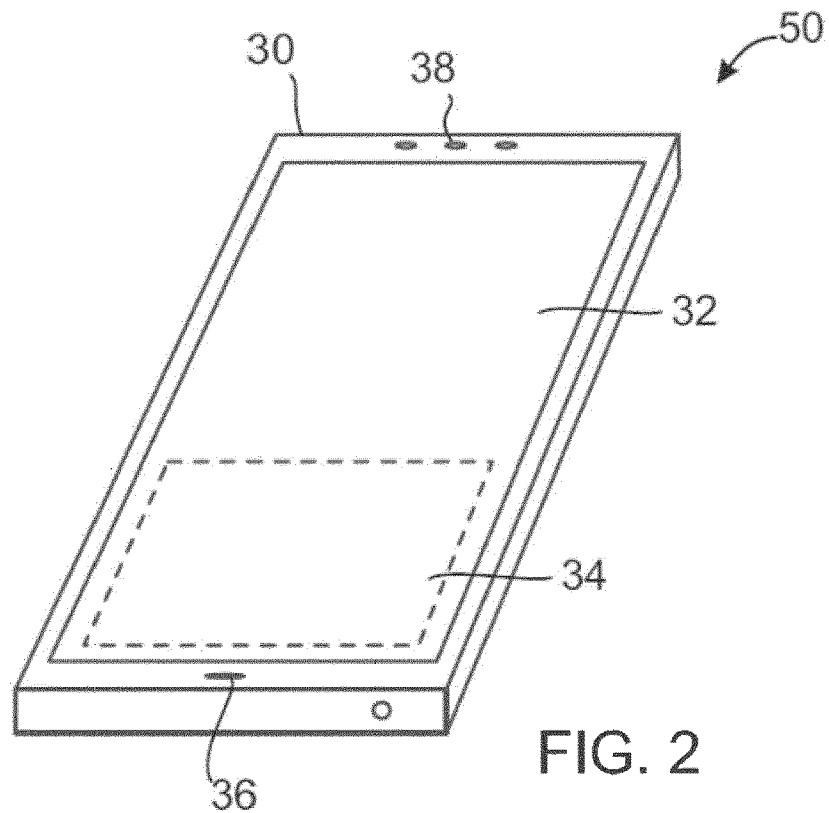
FIG. 2 shows schematically a layout of an apparatus according to an example embodiment.

In this regard, reference is first made to FIGS. 1 and 2, where FIG. 1 shows a schematic block diagram of an apparatus or electronic device 50 according to an example, which may incorporate the arrangement according to the example embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other example embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RANI) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise input means 46 and output means 48 for receiving and transmitting data, respectively.

In the following, example embodiments representing various implementations, will be described using, as an example of an access architecture to which the example embodiments may be applied, a radio access architecture based on Long Term Evolution Advanced (LTE Advanced, LTE-A) or new radio (NR, 5G), without restricting the example embodiments to such an architecture, however. A person skilled in the art appreciates that the example embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
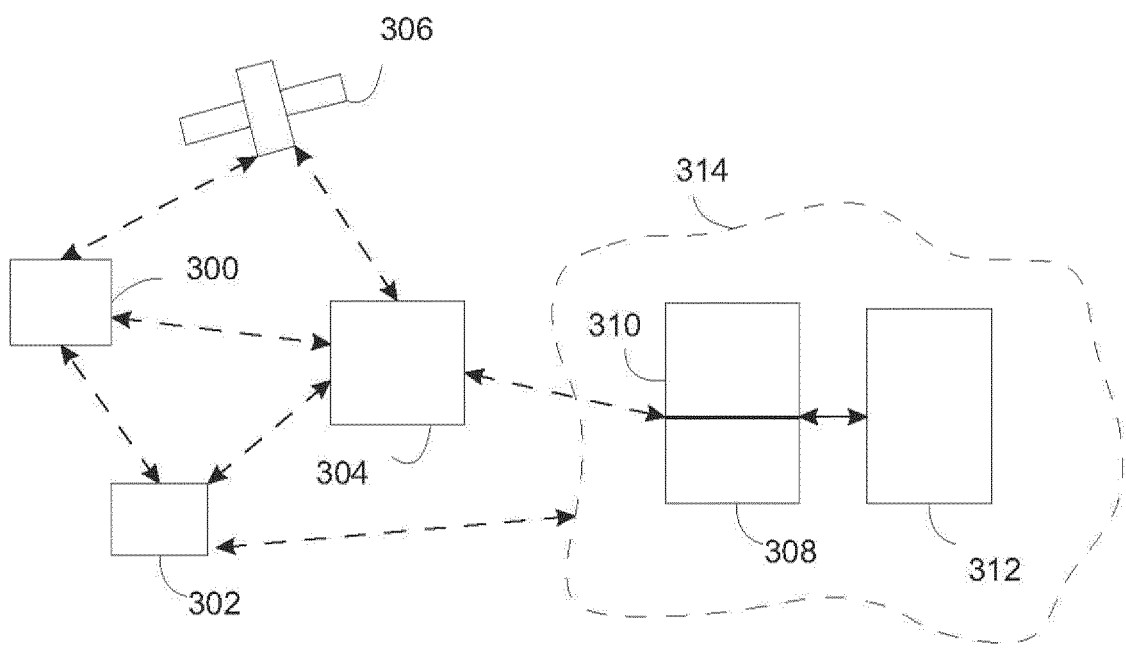
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system may comprise also other functions and structures than those shown in FIG. 3. The example embodiments are not, however, restricted to the system given as an example but a person skilled in the art may apply the solution to other communication systems provided with necessary properties.

FIG. 3 shows an example of a part of a radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device may refer to a portable computing device or non-portable computing device that includes wired or wireless communication devices operating with or without a subscriber identification module (SIM), including, but not limited to, the following types of devices: a mobile station (mobile phone), smartphone, personal digital assistant (PDA), handset, smart watch, vehicle, smart home appliance, device using a wireless modem (alarm or measurement device, etc.), laptop and/or touch screen computer, tablet, game console, notebook, personal computer, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some example embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 3 may provide any kind of these cells. A cellular radio system may be implemented as a multilayer network including several kinds of cells. In multilayer networks, one access node may provide one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, may include, in addition to Home (e/g)NodeBs (H(e/g) nodeBs), a home node B gateway, or HNB-GW (not shown in FIG. 3). A HNB Gateway (HNB-GW), which may be installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

For the 5G technology, one of the design goals has been improved location requirements. To meet the requirements of emerging applications such as intelligent transportation, augmented virtual reality, industrial automation, etc, three new service categories has been defined for 5G: enhanced mobile broadband (eMBB), massive machine-type communication (mMTC) and ultra-reliable low-latency communication (URLLC).

One of the categories introduced in 5G NR (Fifth Generation New Radio) networks is NR Positioning. The two latest versions of the 5G standard are 3GPP Release 16 and 17.

3GPP Release 16 introduced various location technologies to support regulatory and commercial use case. The horizontal positioning requirements for indoor scenarios and outdoor scenarios were specified.

3GPP Release 17 is targeted for a higher accuracy location requirements to meet performance targets having sub-meter level positioning accuracy <1 m for general commercial use cases, and <0.2 m position accuracy for IIoT (Industrial Internet of Things) use cases.

3GPP Release 17 discloses an objective, that to support high accuracy (horizontal and vertical), low latency, network efficiency (scalability, RS overhead, etc.), and device efficiency (power consumption, complexity, etc) requirements for commercial use cases (including general commercial use case and (I)IoT use cases, e.g. positioning techniques, DL/UL (UpLink/DownLink) positioning reference signals, signalling and procedures for improved accuracy, reduced latency, network efficiency and device efficiency should be identified and evaluated.

When receiving a request for a location service associated with a particular UE or when initiating a location service by itself, the 5G Core Access and Mobility Management Function (AMF) sends a location services request to a Location Management Function (LMF). LMF is a network entity, such as a location server, in 5G Core Network, and supports location determination for a UE. The serving gNB provides measurement information for a target UE and communicates the measurement information to the LMF. Thus, LMF may interact with the serving gNB in order to obtain position measurement for the UE including uplink measurements made by an ng-eNG and downlink measurements made by the UE. The LMF returns the result (i.e. a position estimate for the UE) of the location service back to the AMF, which forwards the result to an entity requesting the location.

Device efficient positioning may focus on idle/inactive mode positioning, where the UE (User Equipment) uses data efficient transmission techniques (such as early data and/or small data transmission) for reporting the measurement results to the network. There are also solutions, where a first UE can report its measurements to a second UE which estimates the location of the first UE. However, an improved solution for device efficient positioning that addresses to the requirements of 3GPP Release 17 is needed.

Thus the example embodiments are targeted to a method for device and network efficient positioning, targeting both the control of power consumption and that of the complexity and reporting of the positioning related measurements. The example embodiments are provided from a point of view of a user equipment (UE) and from a point of view of a base station.

As discussed in the background portion of the present disclosure, in the positioning protocol according to the standard, a network entity, e.g. the location management function (LMF) requests the UE to report back timing and/or angular measurements for all detectable beams of all detectable transmit receive points (TRP). By default, the UE treats each positioning request identically, i.e. by listening for, and measuring beamed downlink positioning reference signals (PRS) during a certain time window.

The UE attempts to detect the TRPs indicated by the network, and in case of success, to estimate the time and/or angle of arrival (TOA/AOA) of the line of sight (LOS) for each beam of each detected PRS. One of the scenarios consists of a request from the network to measure N>24 TRPs, each with K>8 beams, yielding the heavy UE task of detecting and measuring N*K>192 signals per positioning request. The problem becomes exacerbated at higher carrier frequencies, as the number of beams per TRP K increases, leading to a large number of measured signals in the order of thousands.

Thus, it may become very impractical for the LMF to ask for a measurements of thousands of beamed PRS and for the UE to perform the measurements at each request, without a prior evaluation of whether the measurement is useful. Therefore, there is a need for a solution which can accommodate a reduced positioning session, in the sense that it allows for a reduced measurement request from the LMF to the UE.

Thus, the example embodiments introduce novel LPP (LTE Positioning Protocol) and NRPPa (New Radio Positioning Protocol Annex) messages to be included in the positioning protocol to enable 3GPP Release 17 compliant device efficient positioning. Regarding the known solutions for device efficient positioning, the example embodiments provide a solution that evaluates whether, for a certain UE, a measurement report has already been provided by a peer UE in the near proximity, whereupon the measurement report does not need to be reported twice. In addition, the present solution evaluates by the UE (in conjunction with signalling provided by the LMF) whether or not a measurement report of a TRP needs to be provided to network, based on the report provided by a peer UE.

In the following, an enhanced method for efficient positioning will be described in more detail, in accordance with various example embodiments.

Figure 4:
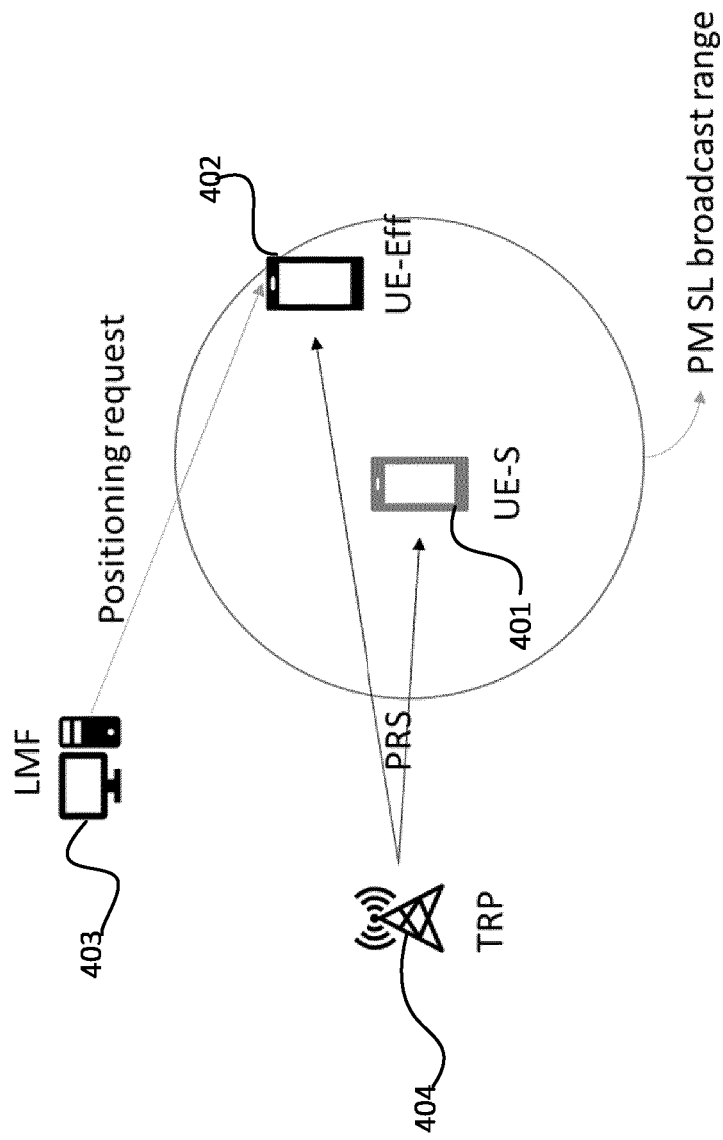
FIG. 4 shows an example illustrating a starting point for the example embodiments.

FIG. 4 illustrates a starting point for efficient positioning according to an embodiment. FIG. 4 shows an aid reference UE, i.e, UE-S 401 and a target UE, i.e., UE-Eff 402. In addition, FIG. 4 shows a location management function LMF 403 and transmit receive points (TRP) 404. The LMF 403 makes a positioning request to the UE-Eff 402. In FIG. 4, TRP 404 beams positioning reference signals (PRS), which are listened and measured by the UE-S 401 and UE-Eff 402. In the example embodiments, the positioning reference signals measured by the UE-S 401 are utilized when determining a position of the UE-Eff 402. This enables the efficient positioning.

The operations of the example embodiments are discussed next:

At the beginning, the LMF designates reference aid UEs to broadcast (i.e. transmit) their most recent positioning measurement over a sidelink (SL) or other peer-to-peer link. The positioning measurement can be TOA/AOA of the detected TRP beams. The reference aid UE can be a UE without battery constraints, or a UE that have been localized as being in challenging propagation environments, etc. The reference aid UE is referred henceforth as UE-S.

The LMF and the designated reference aid UE exchange messages. For example, the aid reference UE "UE-S", provides its capability report to the LMF. The LMF is configured to respond to said UE-S with a configuration message. The configuration message includes at least the configurations for transmitting a positioning measurement PM sidelink SL broadcast. In addition, the exchanged messages may comprise information on a broadcast periodicity, power control, and other SL configuration elements.

The LMF is arranged to configure a target UE "UE-Eff" to process with peer reports. The peer report configuration may include the configuration as of how the PRS resources which are measured by peer UEs (i.e., UE-Ss) and broadcasted in the sidelink are forwarded as peer UE reports from the UE-Eff to the LMF; the configuration for the downselection of the PRS resources reported to the LMF; the configuration on how the UE-Eff classifies the measurement reports broadcasted in sidelink as peer reports, i.e. the classification of whether or not a report broadcasted by UE-S is a peer report.

Then, the UE-Eff is able to listen and to receive the PM SL report transmitted by UE-S. The UE-Eff may store and post-process the report and tag it according to the LMF configuration. Upon reception of a positioning request to locate UE-Eff, the LMF evaluates whether a full-blown positioning measurement campaign and signalling exchange is needed, or whether a reduced signalling exchange would suffice (by contrast to the current LPP, in which LMF implements a unique standard triggering procedure).

An evaluating method performed by the LMF may, according to an example, consist of analyzing historical data for the UE-Eff, e.g. whether recent position estimates and/or a mobility profile are available for the respective UE. The LMF is configured to determine using association algorithms in conjunction with beam coverage maps to select between the standard positioning session (SPS) or the reduced positioning session (RPS). If there is no available recent/reliable history for UE-Eff, then the LMF triggers the standardized positioning protocol (SPS) via LPP. Otherwise, the LMF triggers a location update request through a reduced positioning session (RPS). The LMF provides the measurement request for SPS or for RPS.

The RPS trigger implementation according to an example, may consist of the following elements/routines:
a) Requesting historical information from the serving gNB through a novel New Radio Positioning Protocol Annex (NRPPa) signalling. The historical information may be obtained by a Historical Information Report (HIR), which may consist one or more of the following: UE-Eff type; estimated velocities; serving beam indices; serving cell IDs in the last $\Delta_t$ time window.
b) The LMF may create or update the mobility profile (MP) of UE-Eff and update the displacement equations set (DES) for the UE-Eff by using the HIR. DES profile describes the change in position that UE-Eff is experiencing over time, depending on the UE velocity and acceleration vectors and the type of movement (e.g. accelerated vs. constant velocity). To that end, the LMF needs to estimate at least an acceleration profile of the UE-Eff. This may be done by evaluating the rate of change of two consecutive velocities, i.e., $$a(t_i) = \frac{v(t_i) - v(t_{i-1})}{t_i - t_{i-1}},$$

$t_i \in [t_{current}, t_{current} - \Delta_t]$. Then the mobility profile (MP) may be updated accordingly. Examples of such profiles are:
  Uniform rectilinear motion (constant velocity, zero acceleration);
  Uniformly accelerated rectilinear motion (constant acceleration);
  Rectilinear movement with non-uniform acceleration.

Having updated the DES, the LMF can predict UE-Eff s future locations and therefore select a subset of TRPs and further a subset of their beams (that is, the PRS resources) that the UE-Eff should measure. The LMF provides the selected PRS resources (i.e., the selected TRP beams) which should be reported by UE-Eff to the LMF. The subset may comprise a list of tuples S={(trpID(j), beamIDX(j), j=1:J}. The subset is selected as the most probable PRS resources that the UE-Eff would detect if it is positioned at the location predicted by DES. These are obtained by data association algorithms that use DES in corroboration with the beam coverage map that the LMF possesses (from e.g. raytracing, BVDM (Building Vector Data Map)). In addition, LMF may configure/instruct UE-Eff to conduct and report only those measurements which are not repetition of nearby UE measurements. The UE-Eff may collect the RPS measurement set and provides the reported measurements accordingly. If a PRS resource is measured by the peer UE-S that is identified to be in the near a of the UE-Eff (such that the SL broadcasted measurement can be used as such by the UE-Eff as well), the UE-Eff forwards that report to the LMF. In addition, the UE-Eff reports the ID of the peer UE-S and at least RSRP/RSSI/SINR of the SL message.

After receiving the configuration relating to the measurement reporting and conduction, the UE-Eff evaluates the PRS list and performs a further downselection of which PRS resources needs to be measured. An evaluation method performed by the UE-Eff, according to an embodiment, may comprise the following:
a) evaluating each entry j in the list S and checking if the measurement has been broadcasted by a peer in the recent observation window, $\Delta_{obs}$, where the observation window is set by UE-Eff and it is proportional to its speed;
b) If tuple j has been measured by a nearby UE, e.g. UE-S, and broadcast over sidelink, it is decided to relay this measurement and not to perform a new measurement of its own due to close proximity of the peer that performed the broadcast;

UE-Eff decision as of which broadcast reports are considered as "peer" reports can be made based on e.g. one or more of the following:

The LMF configuration. For example, the LMF designates the group of UE-Ss, such that if a UE-Eff hears a measurement report broadcasted by another UE-S whose ID belongs to the same group as UE-Eff, then this report is considered as "peer".

The measured DL-PRS TOA. In this case, the UE-Eff may initially measure the TOA of a PRS resource by itself, and if it finds out that very similar TOA has been reported by UE-S, then UE-Eff backs off from measuring again that PRS resource and forwards the peer measurement instead. In previous, the definition "very similar" may refers e.g. to a TOA that is less than threshold.

As a consequence, generating a report for PRS j containing at least the following:
i) ID of the peer UE-S.
ii) RSRP and/or RS SI, SINR of the SL message. This later metric quantifies the degree of trust the LMF should put on the similarity of UE-Eff and UE-S reports. For example, a low SINR may indicate bad SL channel conditions, and therefore the LMF may down-prioritize such relayed report.

The RPS report may have the following format:

| Tuple index j | Measurement |
| --- | --- |
| 1 | Estimated TOA/AOA (i.e. new measurement) |
| ... | |
| k | {SL_UE_ID, RSRP, TA, other} (i.e. use the TOA/AOA report from SL_UE_ID instead) |
| ... | |

Figure 5:
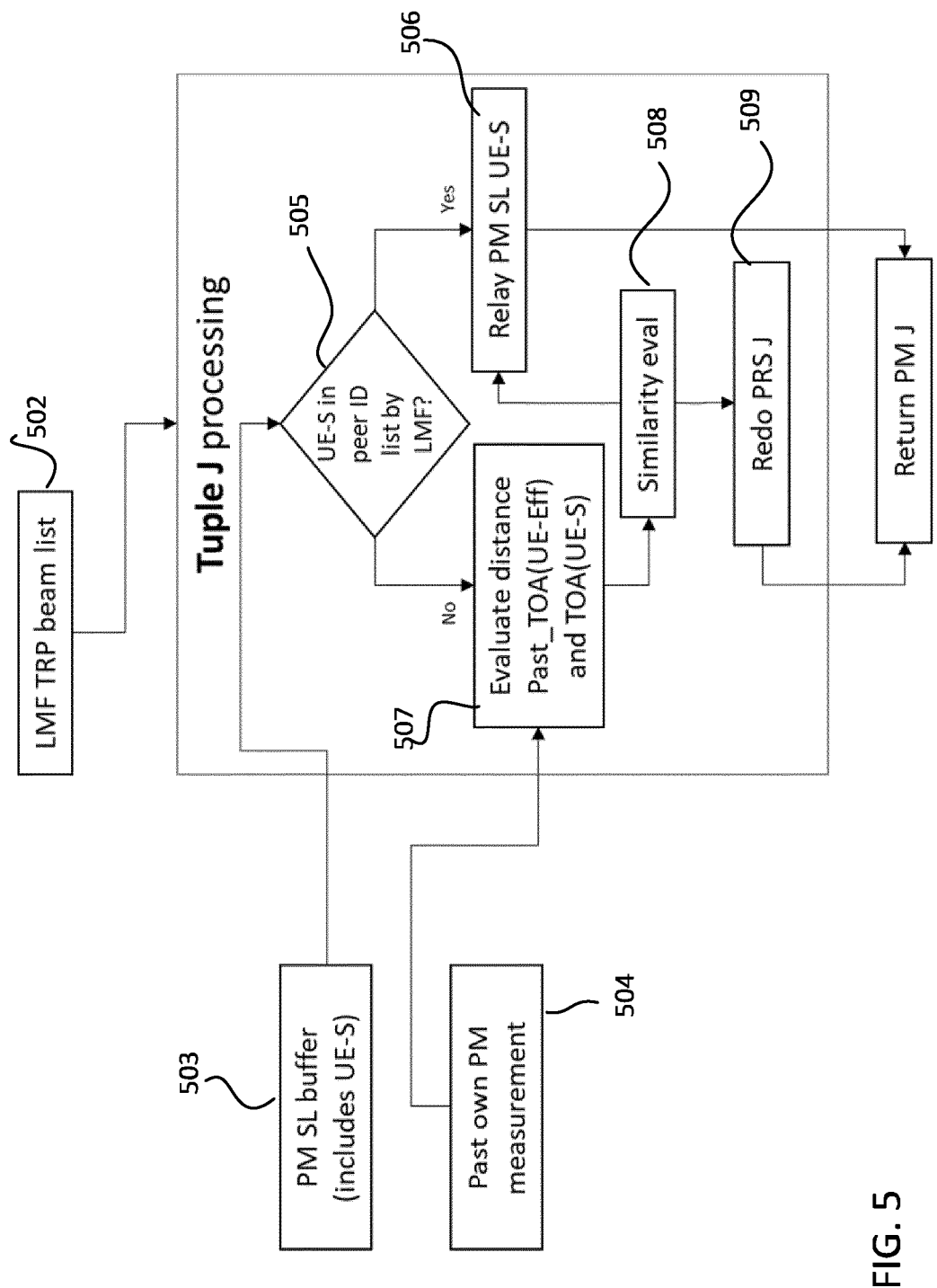
FIG. 5 shows an example of an evaluation method performed at UE-Eff.

The evaluation method, as discussed above, has also been illustrated in FIG. 5. As shown in FIG. 5, UE-Eff compares 505 the SL report 503 from UE-S with its own logging of past measurements 504 of the same PRS, and/or with a group list 502 sent by the LMF, in order to evaluate whether PRS J needs to be re-measured. If the LMF tagged UE-S as belonging to the same group as UE-Eff (that is, "Yes" branch in FIG. 5), then the UE relays 506 the measurement, attaching a power metric of the SL message, such as RSRP/RSSI, to the PRS J report. Otherwise (that is, "No" branch 507 in FIG. 5), UE-Eff checks 607 how the most recent own X TOAs (where X depends on the memory limitation of UE-Eff) measurement of PRS J compares to that of UE-S (most recent or a time series of UE-S TOA). If enough similarity 508, e.g. absolute difference is below a certain threshold, then the UE-Eff may still decide to relay 606 the measurement. Otherwise, the UE-Eff decides to redo 509 the measurement for PRS J.

Finally, the UE-Eff is configured to send back the created RPS report and the LMF proceeds with typical processing for location estimation.

Figure 6:
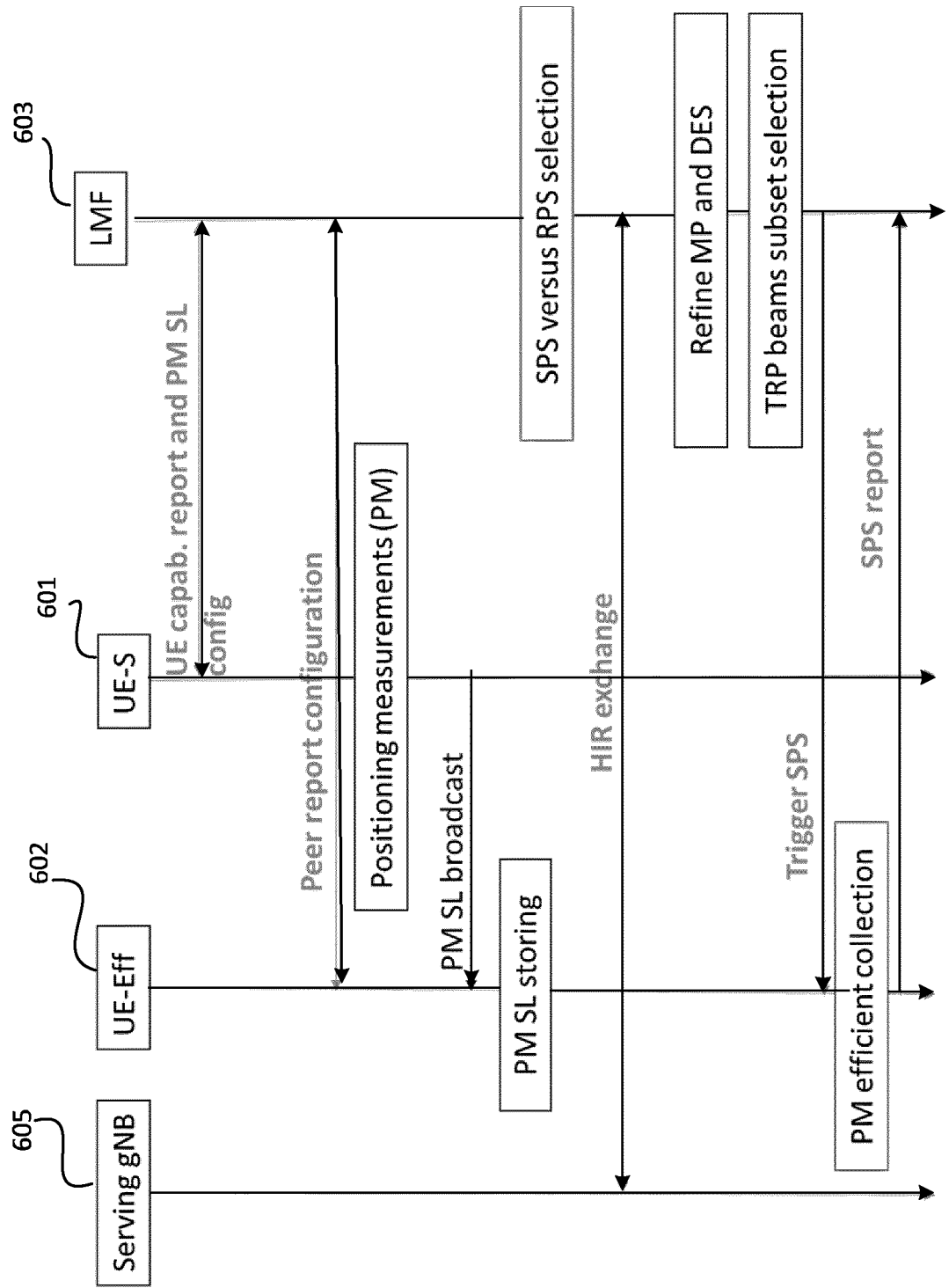
FIG. 6 shows signalling chart between Serving gNB, UE-Eff, UE-S, LMF according to an embodiment.

In FIG. 6, the features concerning the signalling a) between UE-S 601 and LMF 603 about UE's capabilities, and LMF's response with a configuration message, including the configurations for sidelink positioning measurement broadcast; b) from LMF 603 to UE-Eff 602 on the peer report configuration; c) between LMF 603 and Serving gNB 605 on HIR exchange; d) from LMF 603 to UE-Eff 602 to provide a SPS report; e) concerning the PM collection performed by the UE-Eff 602 and reported from the UE-Eff 602 represent how the example embodiments differ from the standard positioning protocol.

Above, example embodiments for combining novel message exchange with processing of the information contained by these messages into a framework that allows device efficient positioning.

Figure 7:
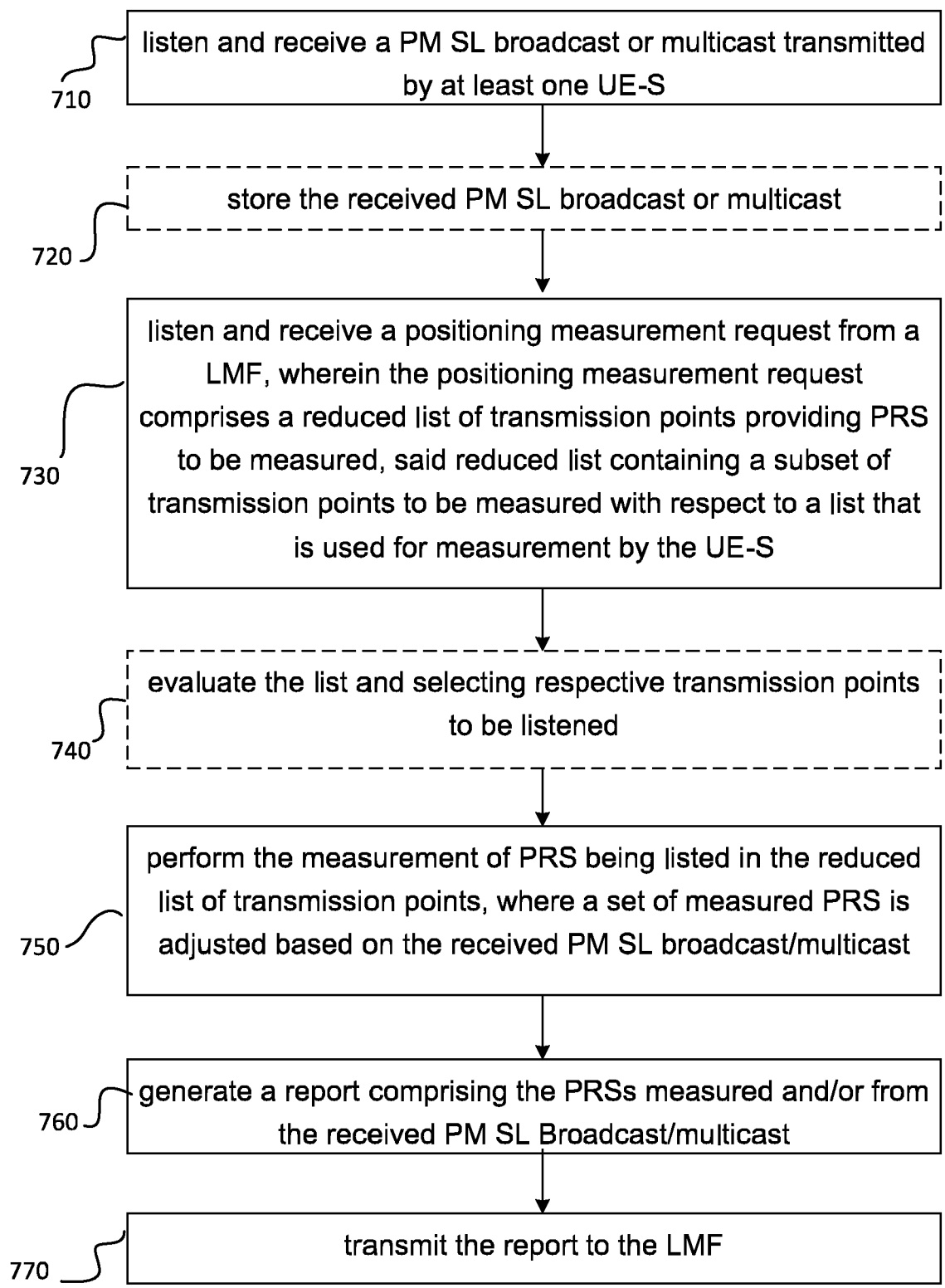
FIG. 7 shows a flowchart for a method carried out by a user equipment.

The method, which is disclosed in flow chart of FIG. 7 as reflecting the operation of a terminal apparatus, such as a user equipment (UE), wherein the method comprises listening and receiving 710 a positioning measurement sidelink (PM SL) broadcast or multicast transmitted by at least one reference user equipment (UE-S); optionally storing 720 the received positioning measurement sidelink (PM SL) broadcast or multicast; listening and receiving 730 a positioning measurement request from a location server, wherein the positioning measurement request comprises a reduced list of transmission points providing positioning reference signals (PRS) to be measured, said reduced list containing a subset of transmission points to be measured with respect to a list that is used for measurement by the reference user equipment (UE-S); optionally evaluating 740 the list and selecting respective transmission points to be listened; performing 750 the measurement of positioning reference signals (PRS) from transmission points being listed in the reduced list of transmission points, where a set of measured PRS is adjusted based on the received PM SL; generating 760 a report comprising the positioning reference signals measured and/or from the received PM SL broadcast/multicast; and transmitting 770 the report to the location server.

An apparatus, such as a UE, according to an aspect comprises means for listening and receiving to a positioning measurement sidelink (PM SL) broadcast or multicast transmitted by at least one reference user equipment (UE-S); optional means for storing the received positioning measurement sidelink (PM SL) broadcast or multicast; means for listening and receiving a positioning measurement request from a location server, wherein the positioning measurement request comprises a reduced list of transmission points providing positioning reference signals (PRS) to be measured, said reduced list containing a subset of transmission points to be measured with respect to a list that is used for measurement by the reference user equipment (UE-S); optional means for evaluating the list and selecting respective transmission points to be listened; means for performing the measurement of positioning reference signals (PRS) from transmission points being listed in the reduced list of transmission points, where a set of measured PRS is adjusted based on the received PM SL broadcast/multicast; means for generating a report comprising the positioning reference signals measured and/or from the received PM SL broadcast/multicast; and means for transmitting the report to the location server.

An apparatus according to a further aspect comprises at least one processor and at least one memory, said at least one memory stored with computer program code thereon, the at least one memory and the computer program code configured to, with the at least one processor, cause the apparatus at least to listen and to receive a positioning measurement sidelink (PM SL) broadcast or multicast transmitted by at least one reference user equipment (UE-S); optionally to store the received positioning measurement sidelink (PM SL) broadcast or multicast; to listen and to receive a positioning measurement request from a location server, wherein the positioning measurement request comprises a reduced list of transmission points providing positioning reference signals (PRS) to be measured, said reduced list containing a subset of transmission points to be measured with respect to a list that is used for measurement by the reference user equipment (UE-S); optionally to evaluate the list and selecting respective transmission points to be listened; to perform the measurement of positioning reference signals (PRS) from transmission points being listed in the reduced list of transmission points, where a set of measured PRS is adjusted based on the received PM SL broadcast/multicast; to generate a report comprising the positioning reference signals measured and/or from the received PM SL broadcast/multicast; and to transmit the report to the location server.

Such apparatuses may comprise e.g. the functional units disclosed in any of the FIGS. 1, 2 and 3 for implementing the example embodiments.

Figure 8:
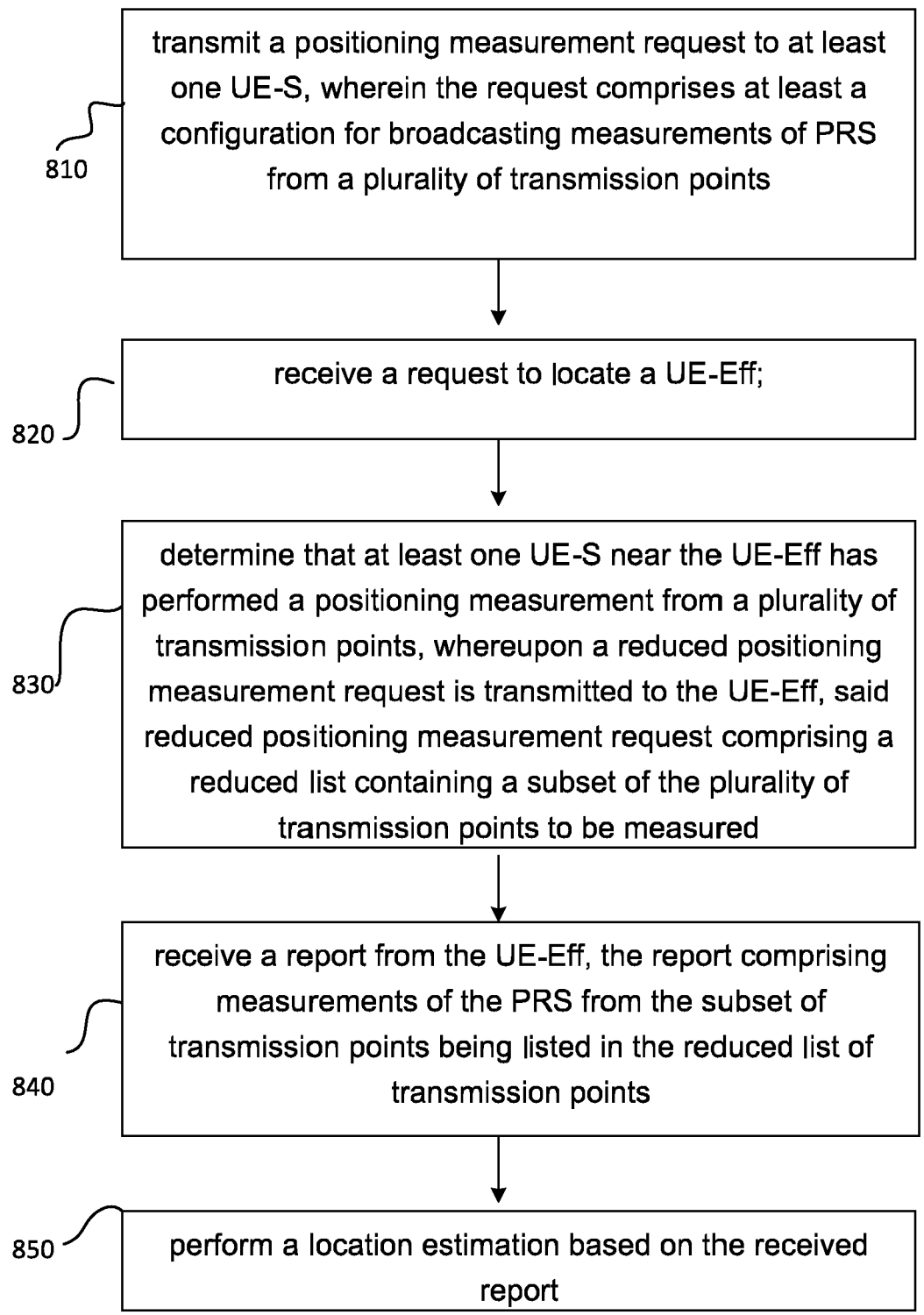
FIG. 8 shows a flow chart for a method carried out by a base station.

A further aspect relates to a computer program product, stored on a non-transitory memory medium, comprising computer program code, which when executed by at least one processor, causes an apparatus at least to listen and to receive a positioning measurement sidelink (PM SL) broadcast or multicast transmitted by at least one reference user equipment (UE-S); optionally to store the received positioning measurement sidelink (PM SL) broadcast or multicast; to listen and to receive a positioning measurement request from a location server, wherein the positioning measurement request comprises a reduced list of transmission points providing positioning reference signals (PRS) to be measured, said reduced list containing a subset of transmission points to be measured with respect to a list that is used for measurement by the reference user equipment (UE-S); optionally to evaluate the list and selecting respective transmission points to be listened; to perform the measurement of positioning reference signals (PRS) being listed in the reduced list of transmission points, where a set of measured PRS is adjusted based on the received PM SL broadcast/multicast, and where the adjustment of measured PRS concerns excluding measured PRS stored in PM SL; generate a report comprising the positioning reference signals measured and/or from the received PM SL broadcast/multicast; and to transmit the report to the location server. The flow chart of FIG. 8 illustrates a method carried out by a network entity, wherein the method comprises transmitting 810 a positioning measurement request to at least one reference user equipment (UE-S), wherein the request comprises at least a configuration for broadcasting measurements of positioning reference signals (PRS) from a plurality of transmission points; receiving 820 a request to locate a target user equipment (UE-Eff); determining 830 that at least one reference user equipment (UE-S) near the target user equipment (UE-Eff) has performed a positioning measurement from a plurality of transmission points, whereupon a reduced positioning measurement request is transmitted to the target user equipment (UE-Eff), said reduced positioning measurement request comprising a reduced list containing a subset of the plurality of transmission points to be measured; receiving 840 a report from the target user equipment (UE-Eff), the report comprising measurements of the positioning reference signals (PRS) from the subset of transmission points being listed in the reduced list of transmission points; and performing 850 a location estimation based on the received report.

Hence, the network may comprise means for transmitting a positioning measurement request to at least one reference user equipment (UE-S), wherein the request comprises at least a configuration for broadcasting measurements of positioning reference signals (PRS) from a plurality transmission points; means for receiving a request to locate a target user equipment (UE-Eff); means for determining that at least one reference user equipment (UE-S) near the target user equipment (UE-Eff) has performed a positioning measurement from a plurality of transmission points, whereupon a reduced positioning measurement request is transmitted to the target user equipment (UE-Eff), said reduced positioning measurement request comprising a reduced list containing a subset of the plurality of transmission points to be measured; means for receiving a report from the target user equipment (UE-Eff), the report comprising measurements of the positioning reference signals (PRS) from the subset of transmission points being listed in the reduced list of transmission points; and means for performing a location estimation based on the received report.

The method and the example embodiments related thereto may be implemented in an apparatus implementing a location server, or a location management function, or other network entity capable of providing location services. The apparatus may comprise at least one processor and at least one memory, said at least one memory stored with computer program code thereon, the at least one memory and the computer program code configured to, with the at least one processor, cause the apparatus at least to transmit a positioning measurement request to at least one reference user equipment (UE-S), wherein the request comprises at least a configuration for broadcasting measurements of positioning reference signals (PRS) from a plurality of transmission points; receive a request to locate a target user equipment (UE-Eff); to determine that at least one reference user equipment (UE-S) near the target user equipment (UE-Eff) has performed a positioning measurement from a plurality of transmission points, whereupon a reduced positioning measurement request is transmitted to the target user equipment (UE-Eff), said reduced positioning measurement request comprising a reduced list containing a subset of the plurality of transmission points to be measured; to receive a report from the target user equipment (UE-Eff), the report comprising measurements of the positioning reference signals (PRS) measured from the subset of transmission points being listed in the reduced list of transmission points; and to perform a location estimation based on the received report.

The present example embodiments provide advantages. For example, the example embodiments provide network efficient positioning by reducing the reporting overhead generated by the UE for frequent positioning requests. In addition, the example embodiments provide device/network efficient positioning by reducing the number of repeated measurements.

In general, the various example embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus, comprising:
   at least one processor; and
   at least one non-transitory memory storing instructions that, when executed with the at least one processor, cause the apparatus to perform:
   listening and receiving a positioning measurement sidelink broadcast or multicast transmitted with at least one reference user equipment;
   listening and receiving a positioning measurement request from a location server, wherein the positioning measurement request comprises a reduced list of transmission points providing positioning reference signals to be measured, said reduced list containing a subset of transmission points to be measured with respect to a list that is used for measurement with the reference user equipment;
   performing the measurement of positioning reference signals from the transmission points being listed in the reduced list of transmission points, where a set of measured positioning reference signals is adjusted based on the received positioning measurement sidelink;
   generating a report comprising at least one of the positioning reference signals measured or from the received positioning measurement sidelink broadcast or multicast; and
   transmitting the report to the location server.

2. The apparatus according to claim 1, wherein the adjustment of measured positioning reference signals concerns excluding measured positioning reference signals stored in the received positioning measurement sidelink broadcast or multicast.

3. The apparatus according to claim 1, wherein the instructions, when executed with the at least one processor, cause the apparatus to perform receiving a peer report configuration from the location server, the peer report configuration comprising one or more of the following: configuration on forwarding positioning reference signals; configuration for selecting the transmission points; or classification of measurement reports.

4. The apparatus according to claim 1, wherein the list of transmission points comprises such transmission points that are detectable with the apparatus if it is located at a predicted position.

5. The apparatus according to claim 1, wherein the instructions, when executed with the at least one processor, cause the apparatus to perform evaluating the reduced list with:
   evaluating an entry in the list to check if a measurement has been broadcasted with a peer user equipment in a certain time window; and
   determining when a tuple entry has been measured and broadcasted with a reference aid user equipment located nearby, and to forward such measurement.

6. A method, comprising:
   listening and receiving a positioning measurement sidelink broadcast or multicast transmitted with at least one reference user equipment;
   listening and receiving a positioning measurement request from a location server, wherein the positioning measurement request comprises a reduced list of transmission points providing positioning reference signals to be measured, said reduced list containing a subset of transmission points to be measured with respect to a list that is used for measurement with the reference user equipment;
   performing the measurement of positioning reference signals being listed in the reduced list of transmission points, where a set of measured positioning reference signals is adjusted based on the received positioning measurement sidelink broadcast or multicast;
   generating a report comprising the positioning reference signals measured and/or from the received positioning measurement sidelink broadcast or multicast; and
   transmitting the report to the location server.

7. A non-transitory program storage device readable with an apparatus, tangibly embodying a program of instructions executable with the apparatus for performing the method of claim 6.

* * * * *